Nov. 13, 1951   M. G. DENTON   2,574,468
STALK CUTTER
Filed Feb. 21, 1946   5 Sheets-Sheet 2
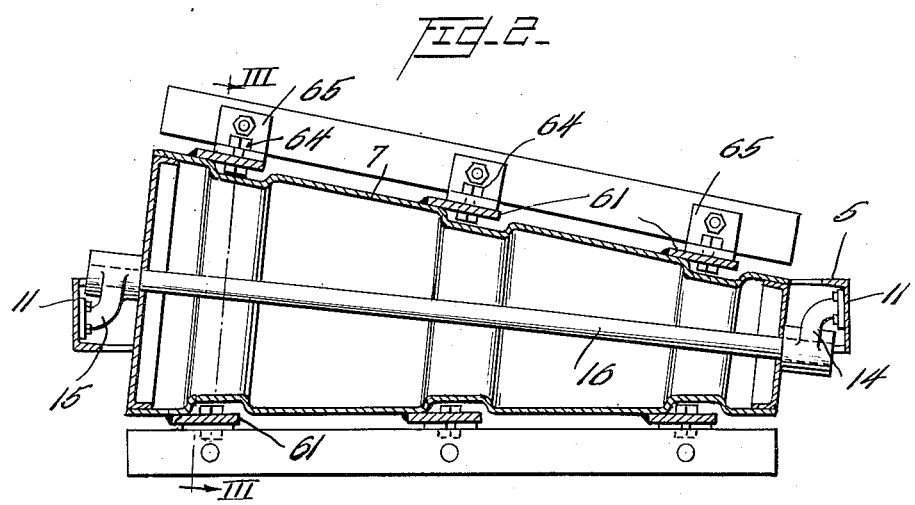
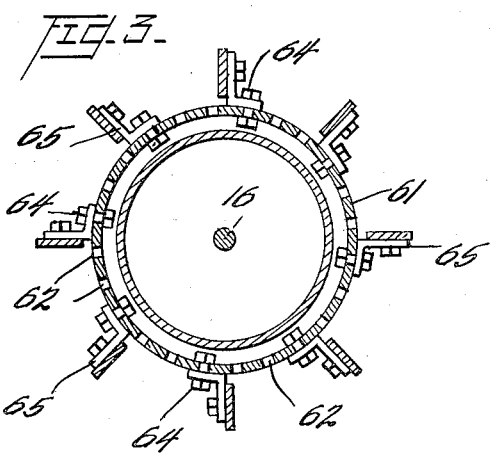
Inventor
Marion G. Denton,
By Sommers & Young
Attorneys

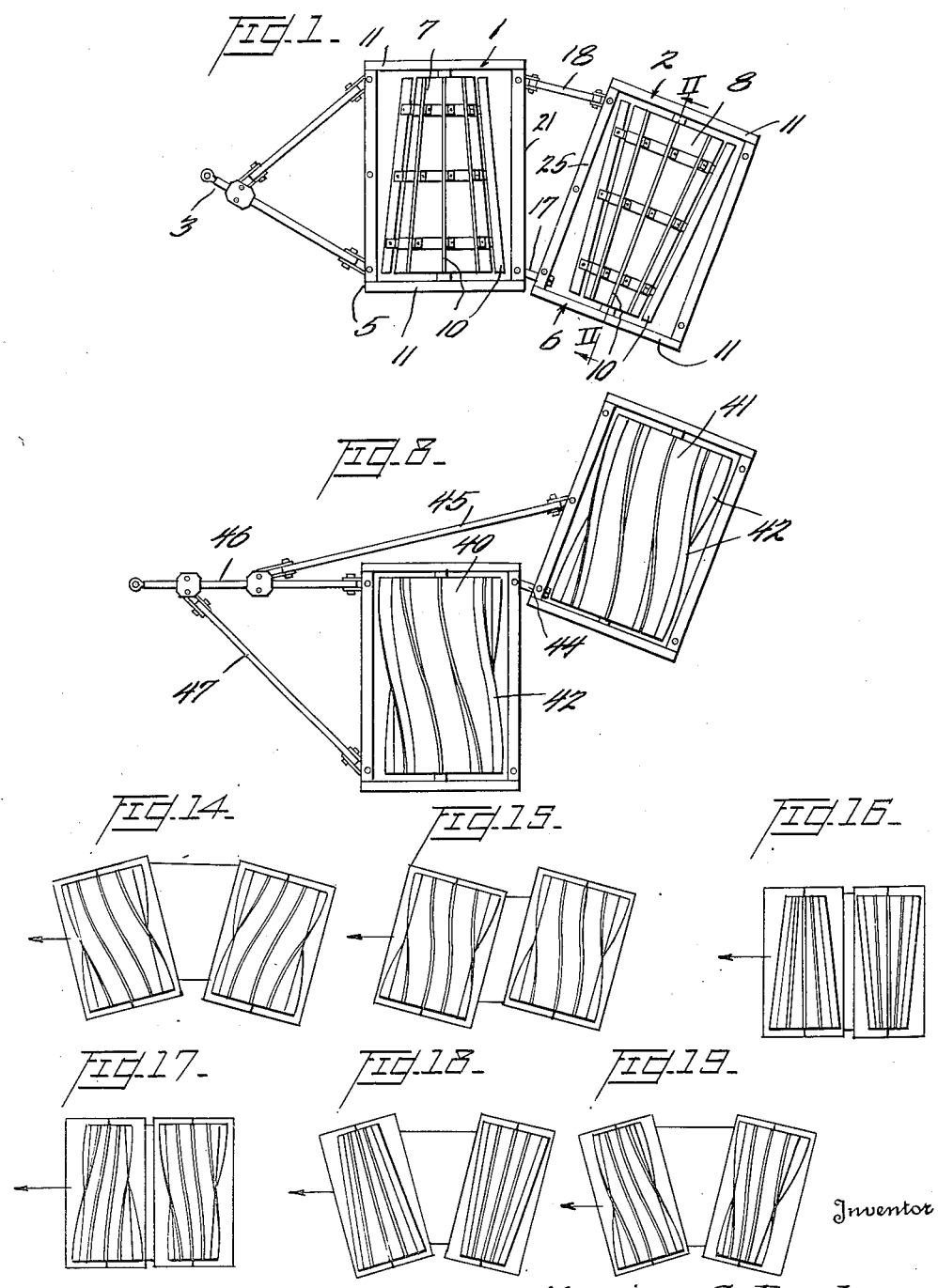

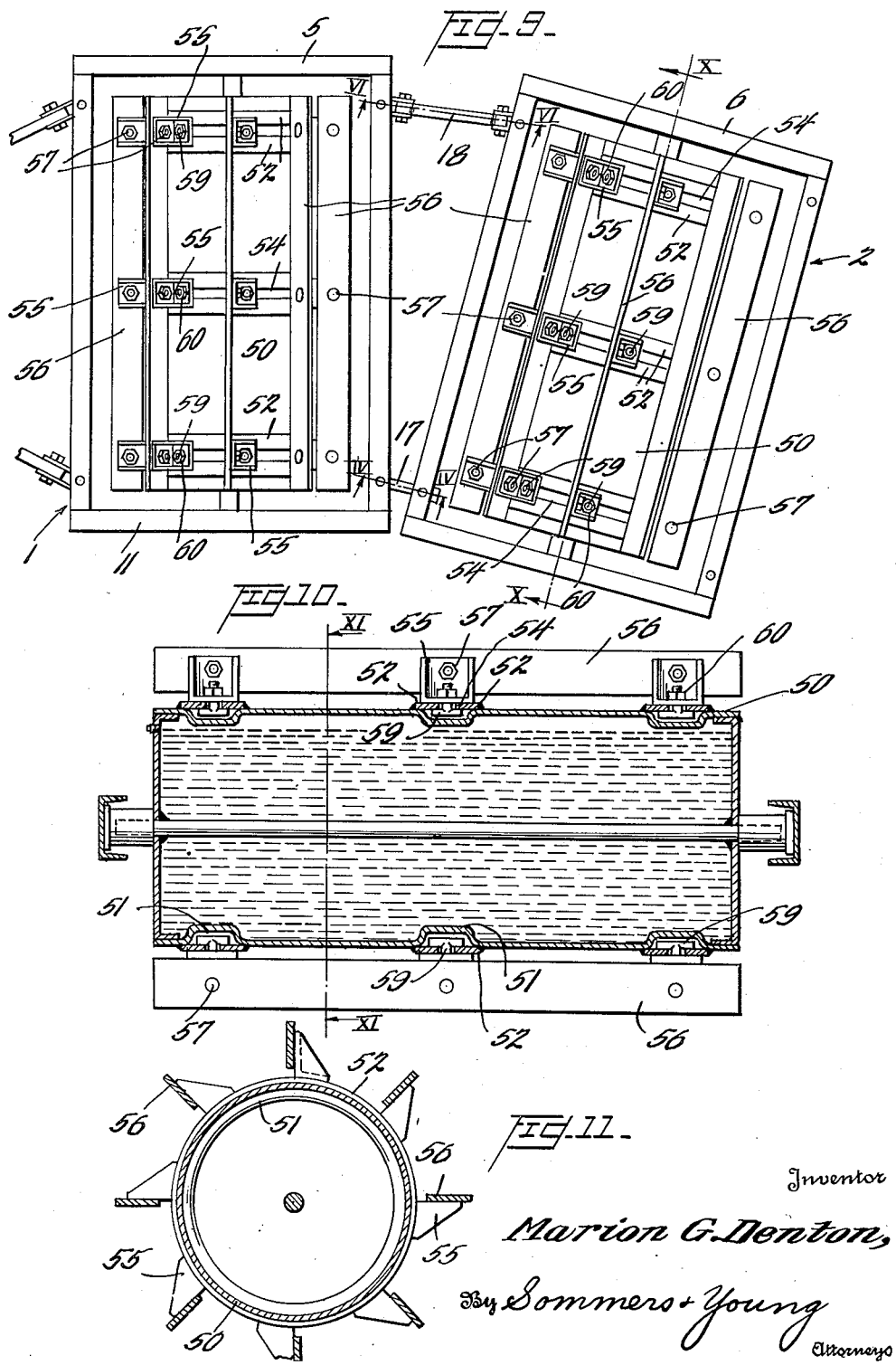

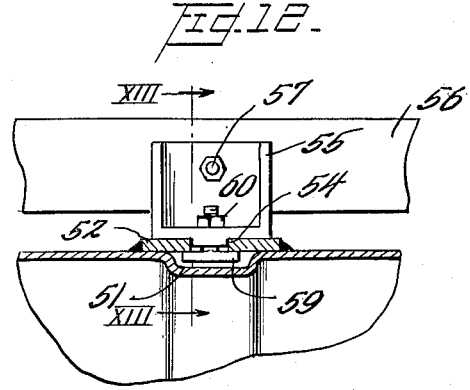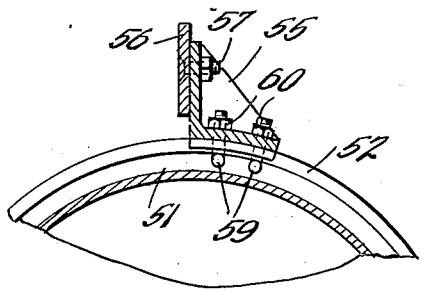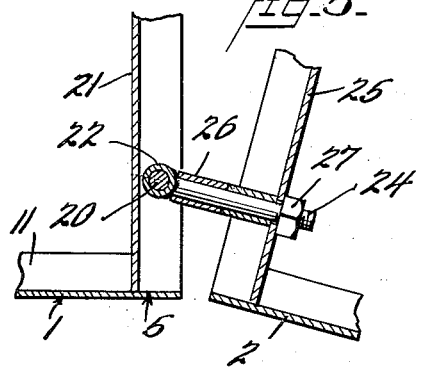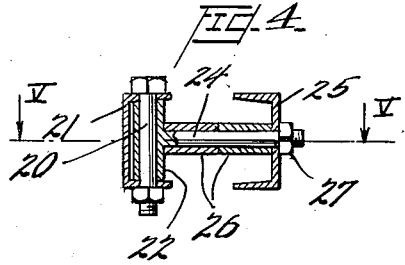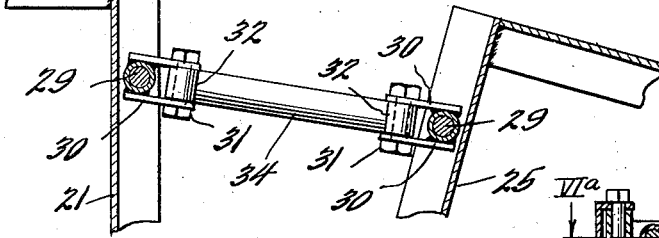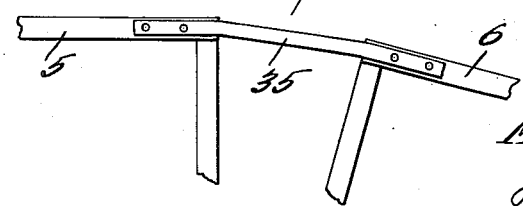
Inventor
Marion G. Denton,
By Sommers & Young
Attorneys

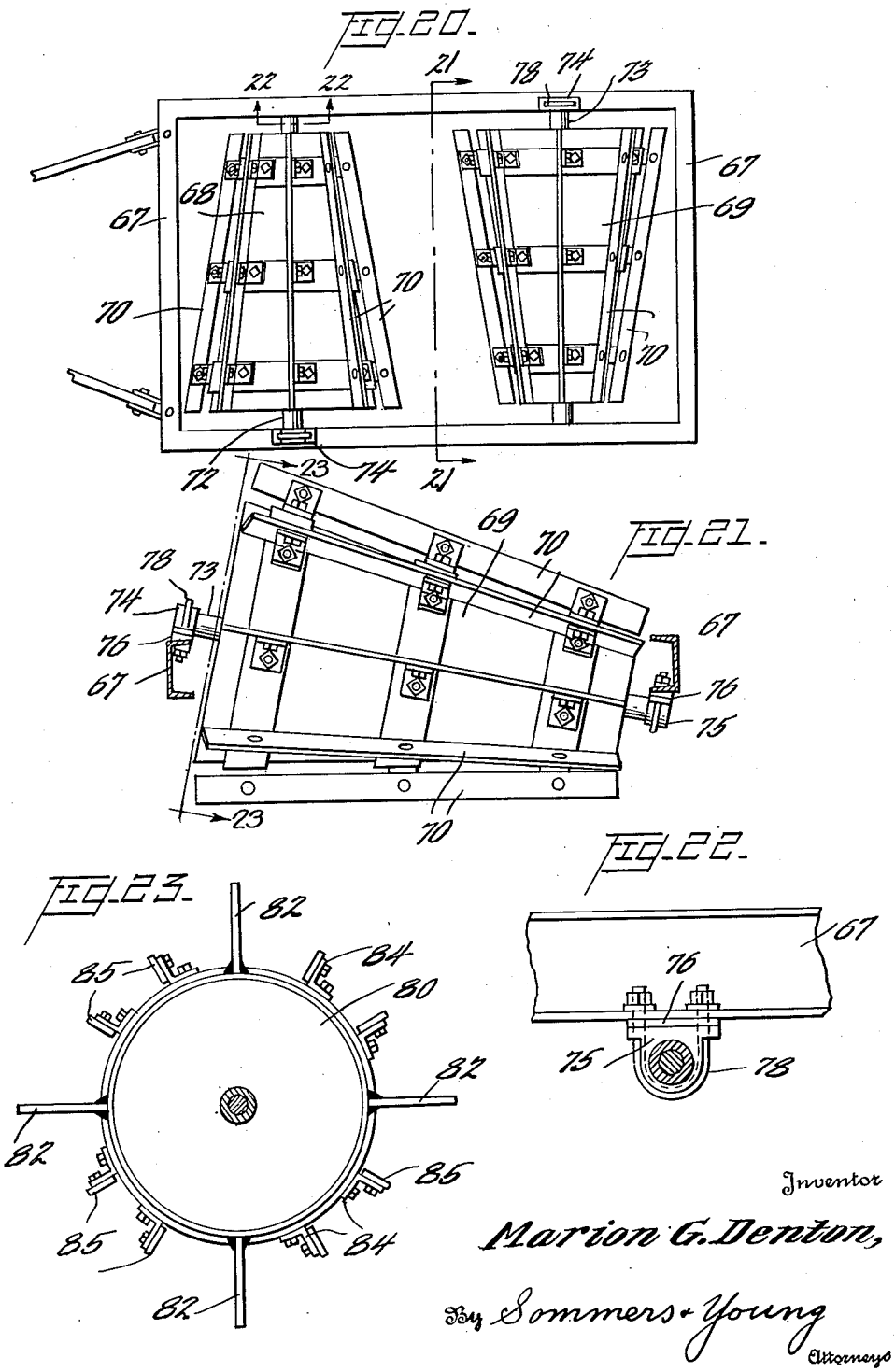

Patented Nov. 13, 1951

2,574,468

UNITED STATES PATENT OFFICE 2,574,468

STALK CUTTER

Marion G. Denton, Auburndale, Fla.

Application February 21, 1946, Serial No. 649,309

11 Claims. (Cl. 55—61)

This invention relates to ground-working machinery, particularly of the kind generally known as stalk, weed, and brush cutters or choppers, and has for its object to provide a machine which will operate more efficiently with respect to the provision of a scraping or scarifying action for cutting and chopping the stalks and weeds and stirring the ground. Machines of this kind have been known in which rollers were provided with a plurality of blades adapted to contact the ground and crush and break the stalks and to stir the ground to a certain extent by a simple cutting or chopping action. The machine according to the present invention is an improvement over these prior devices in that the blades are so arranged that at least portions of each blade will slide longitudinally of themselves within the ground and thus produce a slicing or draw-cut action to cut vegetative matter underground.

According to the present invention, the sliding and stirring action can be produced by arranging the blades of a unit in general in conical arrangement or by using more than one unit connected together with the axes of the rollers thereof arranged so as to form an acute angle, in extension. Preferably the machine comprises a plurality of rollers of conical or cylindrical formation with blades secured on their outer surfaces extending generally in the directions of the axes of the respective rollers and with the faces of the blades approximately radial with respect to said axes. When a plurality of rollers are utilized, the rollers may be deployed either in tandem or in echelon, and in either arrangement it is preferable to have the axes of the respective rollers arranged at an angle to each other instead of parallel, as this also promotes the scraping and scarifying action of the blades on the soil.

A further object of the present invention is to provide arrangements for deploying the rollers in desired relative positions so as to maintain the relative angularity of their axes.

Still another object of the invention is to provide frame means for controlling the position of conical rollers according to which the rollers are able to operate with the entire length of the blades contacting the ground, that is, with the axes of the cones arranged with vertical angles relative to the ground.

Still another object of the invention is to provide for the attachment of a variable number of blades or variable spacing of the blades on the rollers. The variation may be infinite by the provision of continuous adjustment means or may be limited to certain numbers and positions of the blades.

Other objects and advantages of the invention will be apparent from the following description and accompanying drawings of various embodiments thereof serving as illustrations.

In the accompanying drawings:

Fig. 1 is a plan view of one embodiment of the machine;

Fig. 2 is an enlarged vertical sectional view of a machine on the axis of a conical roller of Fig. 1, on section line II—II, and illustrating the manner of mounting the conical roller in its frame with the frame horizontal, and also illustrating a manner of attaching blades to a drum adjustably;

Fig. 3 is a transverse sectional view on the line III—III of Fig. 2;

Fig. 4 is an enlarged detailed horizontal sectional view, on line IV—IV of Fig. 9 parts being broken away to show the connection between two roller frames;

Fig. 5 is a vertical sectional view on the line V—V of Fig. 4;

Fig. 6 is an enlarged vertical sectional view broken away of a connection between two roller frames at the end where said frames are spaced farthest apart, the section being taken on line VI—VI of Fig. 9;

Fig. 6a is a horizontal sectional view on line VIa—VIa of Fig. 6;

Fig. 7 is a plan view of a rigid connection between roller frames at the ends spaced farthest apart;

Fig. 8 is a plan view of another embodiment of the machine;

Fig. 9 is a plan view of a machine having adjustable blades;

Fig. 10 is a transverse sectional view of the machine of Fig. 9 taken on the axis of a drum on line X—X, particularly illustrating the manner of attaching and adjusting the blades on the drum;

Fig. 11 is a transverse sectional view of the drum shown in Fig. 10 taken on line XI—XI;

Fig. 12 is an enlarged sectional view of part of Fig. 10, broken away and showing particularly the manner of adjustably attaching a blade relative to a drum;

Fig. 13 is an enlarged sectional view on the line XIII—XIII of Fig. 12 as viewed from the left;

Figs. 14, 15, 16, 17, 18 and 19 are diagrammatic illustrations of various forms of rollers and ground-working blades, the brackets in said figures indicating diagrammatically that the pairs of rollers are mounted in fixed relation in frames;

Fig. 20 is a plan view of a further embodiment of the machine;

Fig. 21 is a vertical sectional view on line 21—21 of Fig. 20.

Fig. 22 is an enlarged section on line 22—22 of Fig. 20, showing a detail of the connection of one end of the axle with the frame; and Fig. 23 is an end view partially in section on line 23—23 of Fig. 21 but showing a further modified form and arrangement of the blades on the drum.

In Fig. 1 the ground-working machine illustrated comprises two units 1 and 2 arranged to be drawn in tandem by draft means 3. Each unit illustrated in Fig. 1 comprises a frame designated 5 and 6 respectively and a conical drum 7 and 8. The drums 7 and 8 preferably are of considerable weight so as to be able to press the blades 10 into the ground to a considerable extent as the machine is drawn along the ground. As illustrated in Figs. 2 and 3, the drums may be hollow and filled or partially filled with water to provide the desired weight or, if desired, the drums could be of solid construction. As illustrated in Fig. 2, the side channels 11 of the frames 5 and 6 which encompass the rollers may be provided with bearings for the shafts 16 of the rollers located at different heights in order to allow the lower face of the roller blade in contact with the ground to lie approximately parallel to the ground surface while at the same time the frame is maintained generally horizontal. Thus, at one end of a roller a bracket 14 is provided on the frame which extends downwardly, while at the other end a bracket 15 extends upwardly, and in the ends of these brackets bearing means is provided for the ends of the shaft 16 which extends through the roller as illustrated.

According to the arrangement shown in Fig. 1, the two frames are interconnected adjacent their ends by means of bars or struts 17 and 18. Since, according to this system of deployment, with the drums arranged in tandem, the bar 17 at one end is shorter than the bar 18 at the other end, both of the rollers are drawn over the ground with their axes attending at an acute angle to the direction of movement. This angularity is particularly apparent from Fig. 18, which diagrammatically illustrates the rollers and direction of movement as indicated by the arrow. The connection 17 is shown in enlarged Figs. 4 and 5 in more detail. The connection means comprises a bolt 20 which extends through the flanges of channel 21 which may constitute part of the frame 5 of the forward unit. A sleeve 22 is disposed on the bolt 20 and one end of a second bolt 24 is welded to sleeve 22 and extends right angularly thereto. This bolt 24 passes through an opening in channel member 25 of the after unit 2, and positioned on this bolt between the two frame members is one or more spacing sleeve elements 26. The channel member 25 of the frame of the after unit is drawn against the ends of the spacing sleeves by a nut 27. By this arrangement a considerable amount of twisting movement between the two frames is permissible while at all times the desired distance is maintained.

At the other end the connection means may comprise a pair of bolts 29 (Fig. 6) extending substantially vertically through the flanges of the channel members, which bolts are provided with sleeves to which are welded links 30. At their opposite ends links 30 are provided with openings through which extend bolts 31, and the free ends of the links are maintained in spaced relation by spacing sleeve 32. The sleeves 32 are connected together by a rod or tube 34 which may be welded to the sleeves at its ends. This connection provides for vertical movement between the two frame members.

In some cases it may be desirable to connect the frame members at the ends spaced farthest apart by a rigid connection in order to bring the weight of both units to bear in the event one of the units should be passing over a particularly hard portion of ground or some other hard object desired to be broken. Such a connection is illustrated in Fig. 7, in which a rigid bar 35 is shown fixedly secured at its ends to the frames 5 and 6, the ends of the rigid member being bent to conform with the direction of extent of the respective frame members to which they are attached.

In Fig. 8 of the drawing a different deployment of the units of the machine is represented. Also in Fig. 8 the drums 40, 41 are shown as being cylindrical while the blades 42 are helically curved. In this arrangement the drums are positioned in echelon and with their axes at angles to each other and to the direction of movement. The cylindrical drums of Fig. 8 may also be filled or partially filled with water or the like, or may be solid. In operation it is clear that the blades will successively come into contact with the ground as the drums roll forwardly and a portion of each blade will contact the ground before the other portions, thereby securing an initial engagement in the ground, and as the remaining portion of the blade comes into contact with the ground, it will initially slidingly engage therewith and thus stir the ground and cut any stalks or roots which may be in its path. The helical shape of the blades promotes the lateral thrust of the blade against the ground so as to improve the scarifying action.

The drums are maintained in the desired relative positions by means of a short connecting member or strut 44 which may be substantially similar to the member 17 of Fig. 1 and by a long connecting member or strut 45 which is pivotally secured to the frame of the after unit and to the draft bar 46 connecting the draft means with the frame of the forward unit. The forward unit is also maintained in its position by means of a rod 47 which is also pivotally connected at its respective ends to the unit frame and the draft bar.

In using machines of this kind on different kinds of ground and for different purposes, it is sometimes desirable to have a different number or a different spacing of the blades. In order to provide for altering the number or spacing of the blades, the attachment means by which the blades are held on the drums may be made adjustable and removable. The drums shown in Figs. 9, 10 and 11 are represented as being cylindrical, but it will be understood that they might be conical if desired. In the outer surface of the drum 50 a depressed groove 51 is provided extending a substantial distance around the periphery, and along the opposite edges of these grooves are welded hoops or bands 52 which are slightly spaced apart, thus providing a slot 54 over the groove, see Figs. 12 and 13. Brackets 55 to which are bolted the blades 56 by means of bolts 57 are secured to the hoops or bands 52 by means of T-bolts 59 in any desired position. Thus if the blades are too far apart for a particular operation, the nuts 60 or bolts 59 can be loosened and the brackets and blades moved around the drum to a new position, for instance, closer together, and additional blades can be added in the larger spaces thus provided. Since the slot is continuous or substantially continuous, the adjustment provided is not limited to any particular position or numbers of blades.

A further manner of attaching the blades so as to be adjustable is shown in Figs. 2 and 3 in which a conical drum is illustrated as having a plurality of depressed grooves extending substantially around its periphery and over each of which at one side is welded a hoop or band 61. The band is provided with a multiplicity of holes 62 into which engage the bolts 64 for securing the blade-holding brackets 65 to the drum. As illustrated in Fig. 3, the number of blades is eight, but if desired the number could be increased and the spacing decreased by moving the blades to other series of bolt holes 62.

In Fig. 14 a pair of cylindrical drums having helical blades attached thereto is diagrammatically illustrated. The arrow indicates the direction of movement, and it is to be noted that the drums are arranged in tandem with their axes at opposite angles to the direction of movement, whereby the tendencies of the respective drums to skew to one side are counteracted by each other. Also it is noted that the direction of the helices of the rollers is opposite, which has the effect of counteracting the lateral thrust given to the earth by the blades, the after unit having a tendency to return the earth to its initial location.

In Fig. 15 a pair of drums having helical blades of similar direction are shown deployed in tandem with the axis arranged at angles to the direction of movement but parallel to each other. This arrangement of the units is suitable for use where it is desired that the machine shall trail somewhat laterally of the line of motion and engage in a lateral slipping or skewing which tends to stir and agitate the ground.

Fig. 16 illustrates a pair of conical units with blades extending longitudinally of the drums and parallel with the surface of the drums, the drums being arranged in tandem and the larger end of the after drum following the smaller end of the forward drum. As previously explained, drums of this kind must have relative sliding motion relative to the ground throughout all points of their length except one point which theoretically would roll in fixed engagement with the ground. Thus if the ends of the blades at the larger end should remain fixed, all the remaining portion of the blades would engage in a sliding motion and thus scarify the ground and cut roots and stalks. Since the after unit is arranged in opposite position, and the units are arranged in tandem, the ground throughout the entire width of the machine would receive similar treatment.

In Fig. 17 an arrangement of the drums similar to that of Fig. 16 is illustrated but in which the blades are spirally disposed in the surface of the drum.

Fig. 18 illustrates a pair of conical units, the units being similar to those of Fig. 16 but having their axes arranged at opposite angles to the direction of movement, and thus, also at an angle to each other.

Fig. 19 shows an arrangement of conical units in tandem similar to Fig. 18 but in which the blades are arranged spirally.

Instead of having each of the drums mounted in a separate frame, the machine might have two or more drums in a single frame, as illustrated in Figs. 20 and 21. In Figs. 20 and 21 numeral 67 refers to a rectangular frame which may be composed of channel members. Inside this frame a pair of cultivating elements which may be in the form of conical drums 68 and 69 and having ground-engaging blades 70 mounted on their peripheries, are rotatably mounted. The drums are provided with axles 72 and 73, and in order to maintain the frame substantially horizontal, bearings 74 may be provided on the upper side of the frame for the axles at the larger ends of the drums, while bearings 75 are provided on the under side of the frame for the axles at the smaller ends of the drums. Since the axles of these drums will be inclined, it will be necessary to arrange the bearings at appropriate angles, and this may be done by wedge-shaped shims 76 placed between the bearings and the frame. The bearings may be secured to the frame by U-bolts 78 or the like. As illustrated, the axes of the drums are arranged in parallel vertical planes. Furthermore, if desired, the blades could be arranged spirally.

In Fig. 23 a ground-working and stalk-cutting implement is shown which comprises principally a drum or heavy axle 80 adapted to be arranged in a frame (not shown), the drum or axle having a plurality of blades 82 permanently attached thereto in spaced positions around its periphery. The permanently attached blades may, for example, be four in number and can be attached to the center member as by welding or casting. The center member, that is, the drum or heavy axle, may also be provided with further blade-affixing members 84 located intermediate the permanently attached blades and to which removable blades 85 may be attached; for example, eight removable blades may be attached two in each of the spaces intermediate the permanently attached blades. The removable blade attachment means or the removable blades may be so arranged that the distances of the outer edges of the removable blades from the axis of the center member may be equal to, greater than or less than the radial distance of the outer edges of the permanent blades from the axis.

For some purposes the arrangement of the removably attached blades at less radial distance from the center than the permanent blades is more efficient, with the removable blades arranged at less height, that is, distance, from the center. The impact of the permanent blades in operation will be greater than if the removable blades were at the same distance from the center, and thus this arrangement provides for breaking hard ground by the greater impact and also for crushing the ground as it is broken by the larger number of blades. This greater impact is also useful for breaking large stalks and heavy brush stems, while the presence of the removable blades at less height will serve to break the lighter stalks and weeds to shorter length.

A machine adapted for attachment and removal of intermediate removable blades is also useful with only the permanently attached blades for the heavy duty work of breaking the hard ground and heavy brush stems and the like, and subsequent to this treatment of the ground the removable blades can be attached at the desired relative height and further working of the ground with finer pulverization by the greater number of blades can be accomplished.

It is to be understood that the present invention is not to be considered as limited in scope to the particular embodiments illustrated herein except as hereinafter defined in the appended claims.

I claim:

1. In an agricultural ground-working machine, a drum, said drum having a groove formed therein extending substantially around the circumference of the drum, a pair of hoops extending around said drum and extending partially over said groove from opposite sides in spaced relation to each other, thereby leaving a slot over the groove, a plurality of blades, and securing means for attaching the blades to said slot-forming hoops in substantially any desired angular positions with respect to the axis of the drum, whereby the position and number of blades can be altered.

2. An agricultural ground-working machine as defined in claim 1, and in which the securing means comprises T-bolts the heads of which engage within the slot, and brackets connecting the blades with said bolts.

3. In an agricultural ground-working machine, a drum, a groove extending substantially around said drum, a flange secured to said drum and extending partially over said groove, a plurality of openings extending through said flange at a multiplicity of angularly spaced points about the axis of the drum, a plurality of blades, and bolts for securing said blades to said flange selectively at various positions about the periphery of the drum, whereby the positions and number of blades can be varied at will, and draft means for drawing said drum over the ground.

4. An agricultural machine for working the ground and breaking and cutting stalks and roots and the like, comprising a pair of cylindrical drums, an axle in each drum, circumferentially spaced blades attached to the outer surface of each drum, each blade extending generally in the direction of the axis of the drum with its flat face extending substantially radially with respect to the axis of the respective drums, a frame embracing each drum in which each axle is mounted, and draft means attached to the frame of one drum at an angle to the direction the drum would roll if its axle were simply turned and strut means interconnecting the drum frames, the axles of the drums forming an acute angle, whereby, as the machine is drawn over the ground the blades enter the ground and at least parts thereof slide longitudinally relative to the ground to produce a slicing action but without causing lateral displacement or inversion of the soil.

5. An agricultural machine for working the ground and breaking and cutting stalks and roots and the like, comprising a pair of cylindrical drums of substantially similar size, an axle in each drum, circumferentially spaced blades attached to the outer surface of each drum, each blade extending generally in the direction of the axis of the drum with its flat face extending substantially radially, a frame embracing each drum in which each axle is mounted, and draft means attached to the frame of one drum at an angle to the direction the drum would roll if its axle were simply turned and strut means interconnecting the drum frames, the axles of the drums forming an acute angle, whereby, as the machine is drawn over the ground the blades enter the ground and at least parts thereof slide longitudinally relative to the ground to produce a slicing action but without causing lateral displacement or inversion of the soil.

6. An agricultural machine for working the ground and breaking and cutting stalks and roots and the like, comprising a pair of cylindrical drums, an axle in each drum, circumferentially spaced blades attached to the outer surface of each drum, each blade extending generally in the direction of the axis of the drum with its flat face extending substantially radially, a frame embracing each drum in which each axle is mounted, and draft means attached to the frame of one drum at an angle to the direction the drum would roll if its axle were simply turned and strut means inter-connecting the drum frames, the axles of the drums forming an acute angle, said strut means having universally movable connections with said frames, whereby, as the machine is drawn over the ground the blades enter the ground and at least parts thereof slide longitudinally relative to the ground to produce a slicing action but without causing lateral displacement or inversion of the soil.

7. An agricultural machine for working the ground and breaking and cutting stalks and roots and the like, comprising a pair of cylindrical drums, an axle in each drum, circumferentially spaced blades attached to the outer surface of each drum, each blade extending generally in the direction of the axis of the drum with its flat face extending substantially radially, a frame embracing each drum in which each axle is mounted, and draft means attached to the frame of one drum, laterally of a central plane perpendicular to the axis of said one drum, at an angle to the direction the drum would roll if its axle were simply turned, and strut means interconnecting the drum frames, the axles of the drums forming an acute angle, whereby, as the machine is drawn over the ground the blades enter the ground and at least parts thereof slide longitudinally relative to the ground to produce a slicing action but without causing lateral displacement or inversion of the soil.

8. An agricultural machine for working the ground and breaking and cutting stalks and roots and the like, comprising a pair of cylindrical drums, an axle in each drum, at least two guides having continuous free edges extending circumferentially substantially completely around each drum, a plurality of ground-engaging blades, and means for removably securing said blades to said guides along the free edges thereof, in any desired angularly spaced positions about the axes of the drums, whereby the numbers and positions of the blades can be altered at will, said blades extending generally in the direction of the axis of its respective drum with its flat faces extending substantially radially with respect to the axis of the respective drums, a frame embracing each drum in which each axle is mounted, and draft means attached to the frame of one drum at an angle to the direction the drum would roll if its axle were simply turned, and strut means interconnecting the drum frames, the axles of the drums forming an acute angle, whereby, as the machine is drawn over the ground the blades enter the ground and at least parts thereof slide longitudinally relative to the ground to produce a slicing action but without causing lateral displacement or inversion of the soil.

9. An agricultural machine for working the ground and breaking and cutting stalks and roots and the like, comprising a pair of drums, an axle in each drum, circumferentially spaced blades attached to the outer surface of each drum, each blade extending generally in the direction of the axis of the drum with its flat face extending substantially radially, with respect to the axes of the respective drums, a frame embracing each drum in which each axle is mounted, and draft means attached to the frame of one drum at an angle to the direction in which the drum would roll if its axle were simply turned, and strut means interconnecting the drum frames, the axles of the drums forming an acute angle, whereby, as the machine is drawn over the ground the blades enter the ground and at least parts thereof slide longitudinally relative to the ground to produce a slicing action but without causing lateral displacement or inversion of the soil.

10. In a mobile agricultural ground-working machine, a drum, circular blade-attaching members secured to the outer surface of said drum and extending substantially completely around the circumference of the drum, a plurality of ground-engaging blades, interengaging means operatively connected to the blades and attaching members for removably securing said blades to said blade-attaching members selectively at any desired positions with the blades extending generally longitudinally of the axis of the drum, whereby the positions and number of blades secured around the circumference of the drum may be altered substantially at will so that the length of cutting of vegetative matter and the impact of the blades striking the ground can be altered.

11. In a mobile agricultural ground working and stalk- and root-cutting apparatus, a drum, a plurality of ground-engaging blades, blade-mounting means on said drum extending substantially continuously around the circumference of said drum and formed for attachment of the blades at substantially any desired position and spacing, interengaging means operatively connected to the blades and mounting means for removably attaching the blades to said mounting means with the blades extending longitudinally in the general direction of the axis of the drum and with their side faces substantially radial, whereby the positions and number of blades secured around the circumference of the drum may be altered substantially at will so that the length of cutting of vegetable matter and the impact of the blades striking the ground can be altered.

MARION G. DENTON.

REFERENCES CITED

The following references are of record in the file of this patent:

UNITED STATES PATENTS

| Number | Name | Date |
|---|---|---|
| 609,196 | De Souza | Aug. 16, 1898 |
| 713,207 | Cotten | Nov. 11, 1902 |
| 773,088 | Mize | Oct. 25, 1904 |
| 2,151,918 | Ingram | Dec. 14, 1936 |

FOREIGN PATENTS

| Number | Country | Date |
|---|---|---|
| 540,228 | Germany | Mar. 14, 1930 |